July 17, 1956  R. W. VERGOBBI ET AL  2,754,644
METHOD OF AND APPARATUS FOR PRODUCING FILLED BAGS
Filed June 10, 1953  6 Sheets-Sheet 1

INVENTOR.
Robert W. Vergobbi
BY Alfred L. Bergeron
J. Stanley Churchill
ATTORNEY

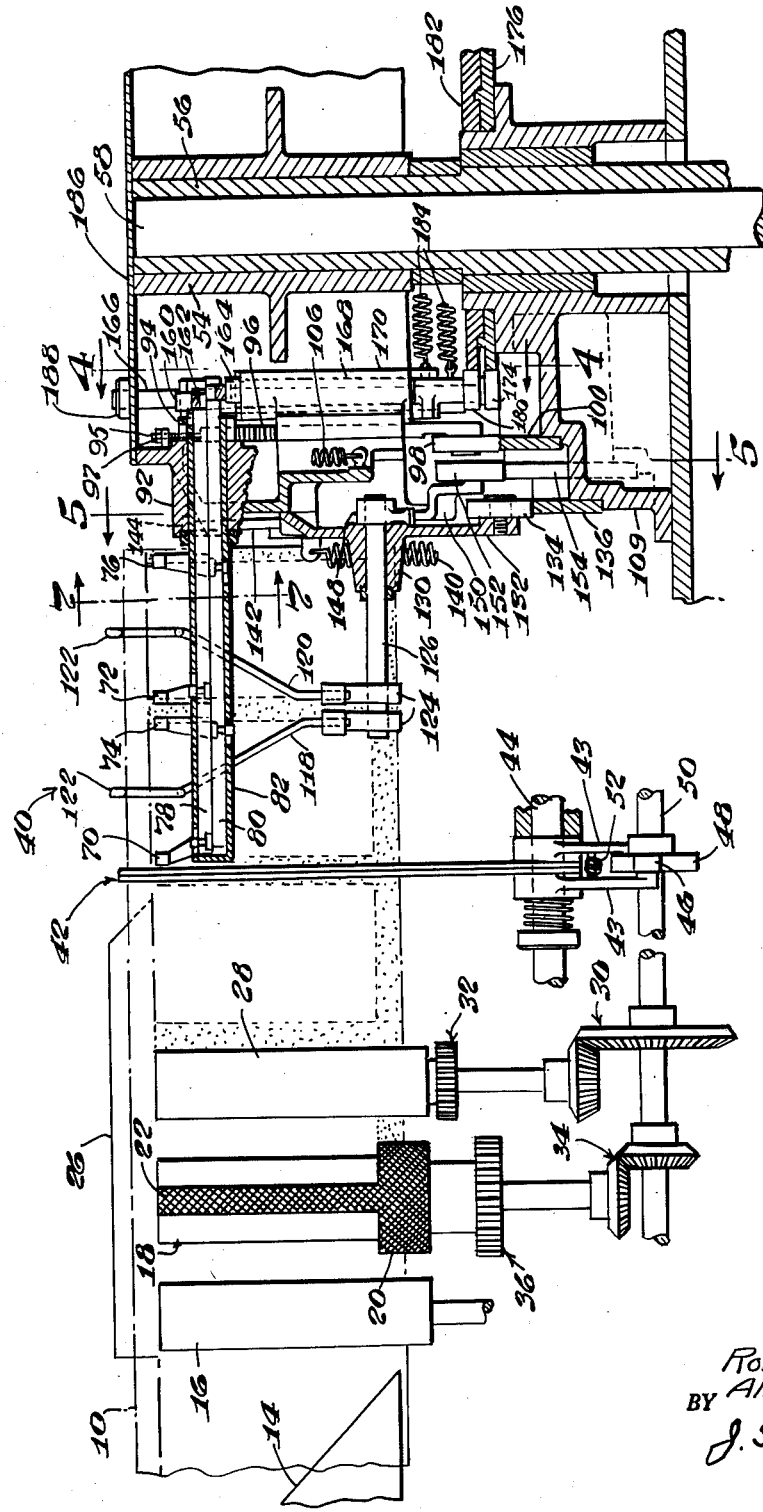

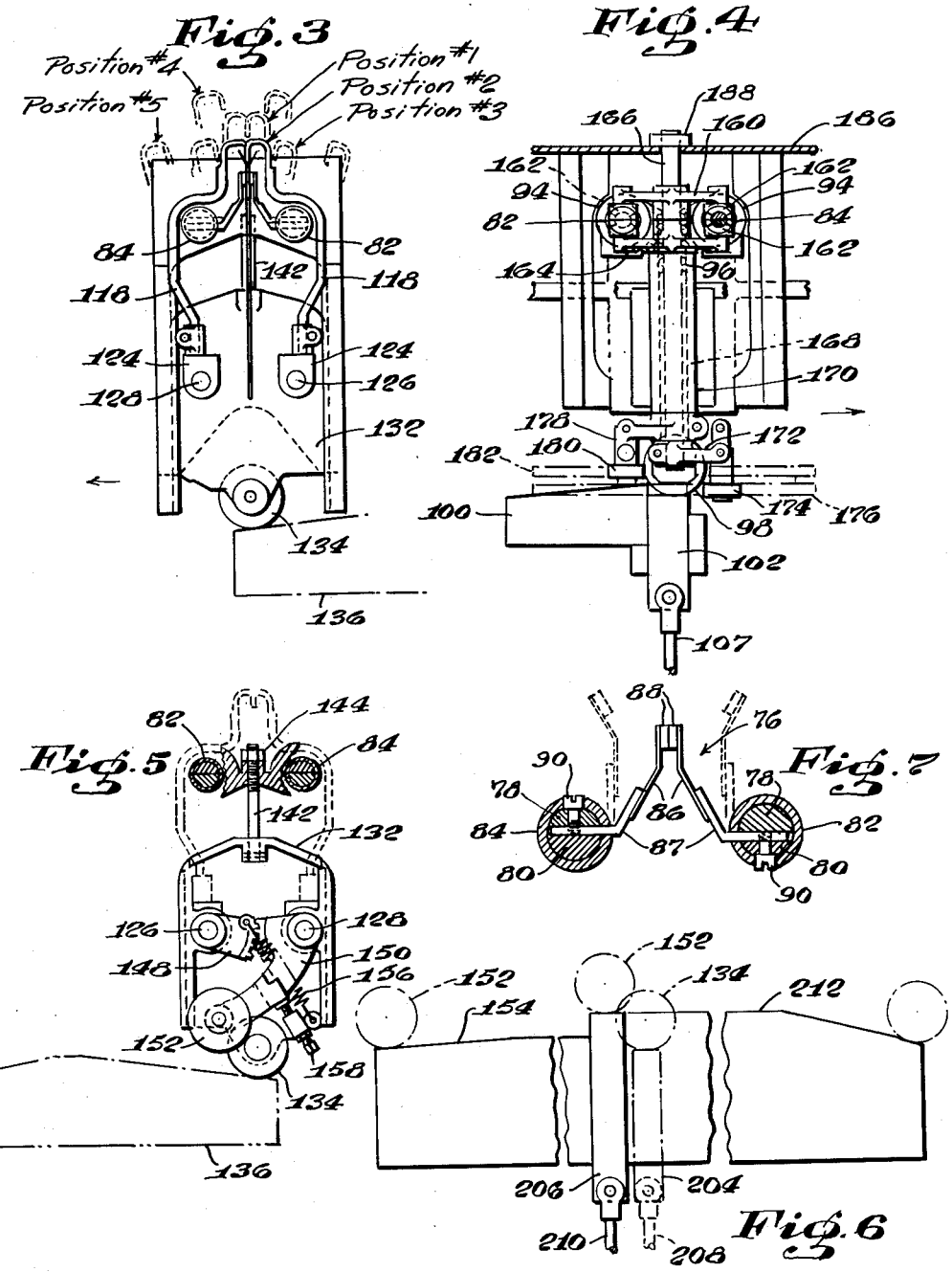

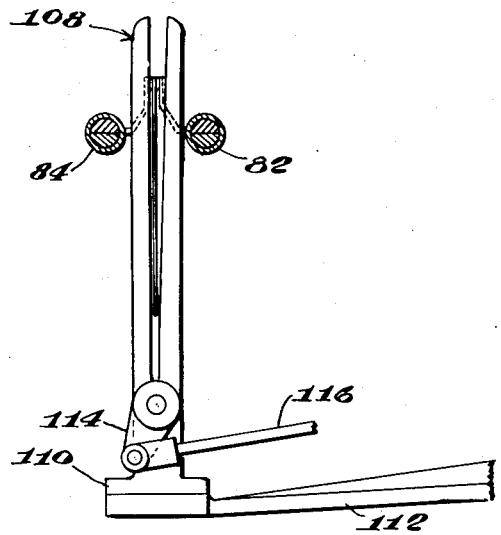
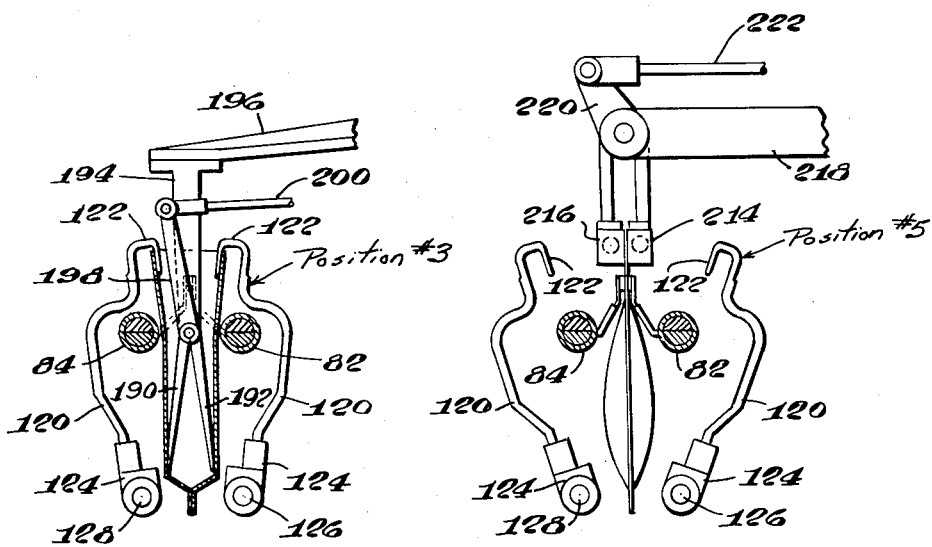
Fig. 8
Fig. 9
Fig. 10

July 17, 1956 R. W. VERGOBBI ET AL 2,754,644
METHOD OF AND APPARATUS FOR PRODUCING FILLED BAGS
Filed June 10, 1953 6 Sheets-Sheet 5

INVENTOR.
Robert W. Vergobbi
BY Alfred L. Bergeron
J. Stanly Churchill
ATTORNEY

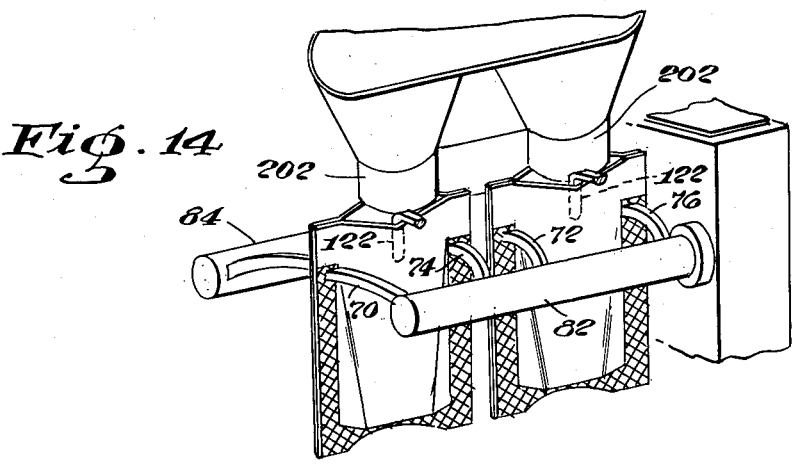
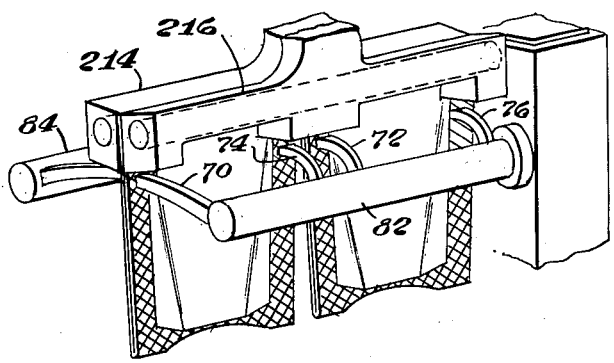
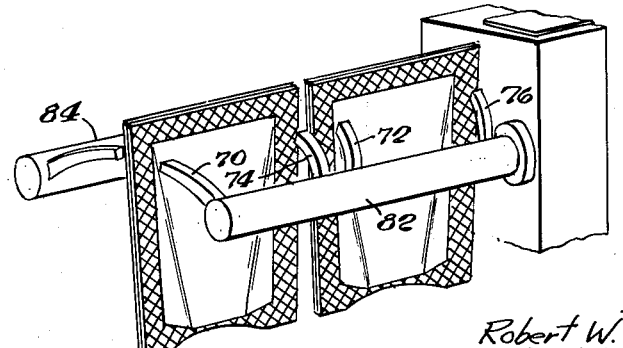

United States Patent Office 2,754,644
Patented July 17, 1956

2,754,644

METHOD OF AND APPARATUS FOR PRODUCING FILLED BAGS

Robert W. Vergobbi, Quincy, and Alfred L. Bergeron, Wollaston, Mass., assignors to Pneumatic Scale Corporation, Limited, Quincy, Mass., a corporation of Massachusetts Application June 10, 1953, Serial No. 360,638

14 Claims. (Cl. 53—29)

This invention relates to a method of and apparatus for producing filled bags.

The invention has for an object to provide a novel method of and apparatus for producing filled bags, such as filled individual flat bags, in an efficient, economical, rapid and practical manner.

With this general object in view and such others as may hereinafter appear, the invention consists in the method of and apparatus for producing filled bags hereinafter described and particularly defined in the claims at the end of this specification.

In the drawings illustrating the preferred form of the invention:

Fig. 2 is a side elevation of a portion of the apparatus shown in Fig. 1, the bag supporting carrier being shown in cross section;

Fig. 3 is a front elevation of one of the carrier heads;

Fig. 4 is a rear view of a carrier head as viewed from the line 4—4 of Fig. 2;

Fig. 5 is a similar view as seen from the line 5—5 of Fig. 2;

Fig. 6 is a detail view of the cams for operating the bag spreading mechanism;

Fig. 7 is a cross-sectional view of a pair of bag supporting grippers as viewed from the line 7—7 of Fig. 2;

Fig. 8 is a detail view of the shearing mechanism for severing a duplex bag section;

Fig. 9 is a detail view of bag expanding mechanism to be described;

Fig. 10 is a side elevation of the top sealing mechanism; and

Figs. 11 to 16 are perspective views diagrammatically illustrating the steps in the present method of producing filled bags.

In general, the present invention contemplates a method of and apparatus for making individual filled bags, preferably from an elongated web of heat sealable bag forming material, by folding the web longitudinally and sealing the same at spaced transverse portions to form a strip of connected bag sections open at the top. Preferably, the folded bottom edge of the bags are also sealed. Provision is made for severing the bag sections from the strip and for supporting the same between grippers engaging the bag at the ends of the open mouth portion, and while thus supported, provision is made for opening the mouth portion and separating the flat sides of each bag sufficiently to provide adequate space between the side walls to permit filling of the bag. After the filling operation, the mouth portions of the bag are again brought together, and provision is made for sealing the mouth portion to complete the production of the bag.

In the illustrated and preferred embodiment of the invention the bags are supported in successive carrier heads mounted in an intermittently operated rotary spider arranged to be moved to present the carrier heads to the various stations of operation, and provision is preferably made for supporting two bags in each carrier head and for opening, filling and top sealing the two bags simultaneously. In the operation of the illustrated apparatus, successive endmost duplex bag sections are presented between the grippers of successive carrier heads at the receiving station. The duplex section is subsequently severed medially through a transverse sealed portion to form two individual bags supported in each carrier, each bag being supported between pairs of grippers engaging the ends of the mouth portion. Provision is then made for moving the grippers of each bag toward each other a short distance and for simultaneously separating the side walls of the flat bags to open the bag wide whereupon a charge of the commodity is deposited in each bag. Thereafter, the bag supporting grippers are again moved away from each other to bring the opposed walls of the mouth portion together, and provision is then made for sealing the mouth of the bag. The grippers are then operated to release the bags which may fall onto a conveyer belt to be discharged from the machine.

Figure 1:
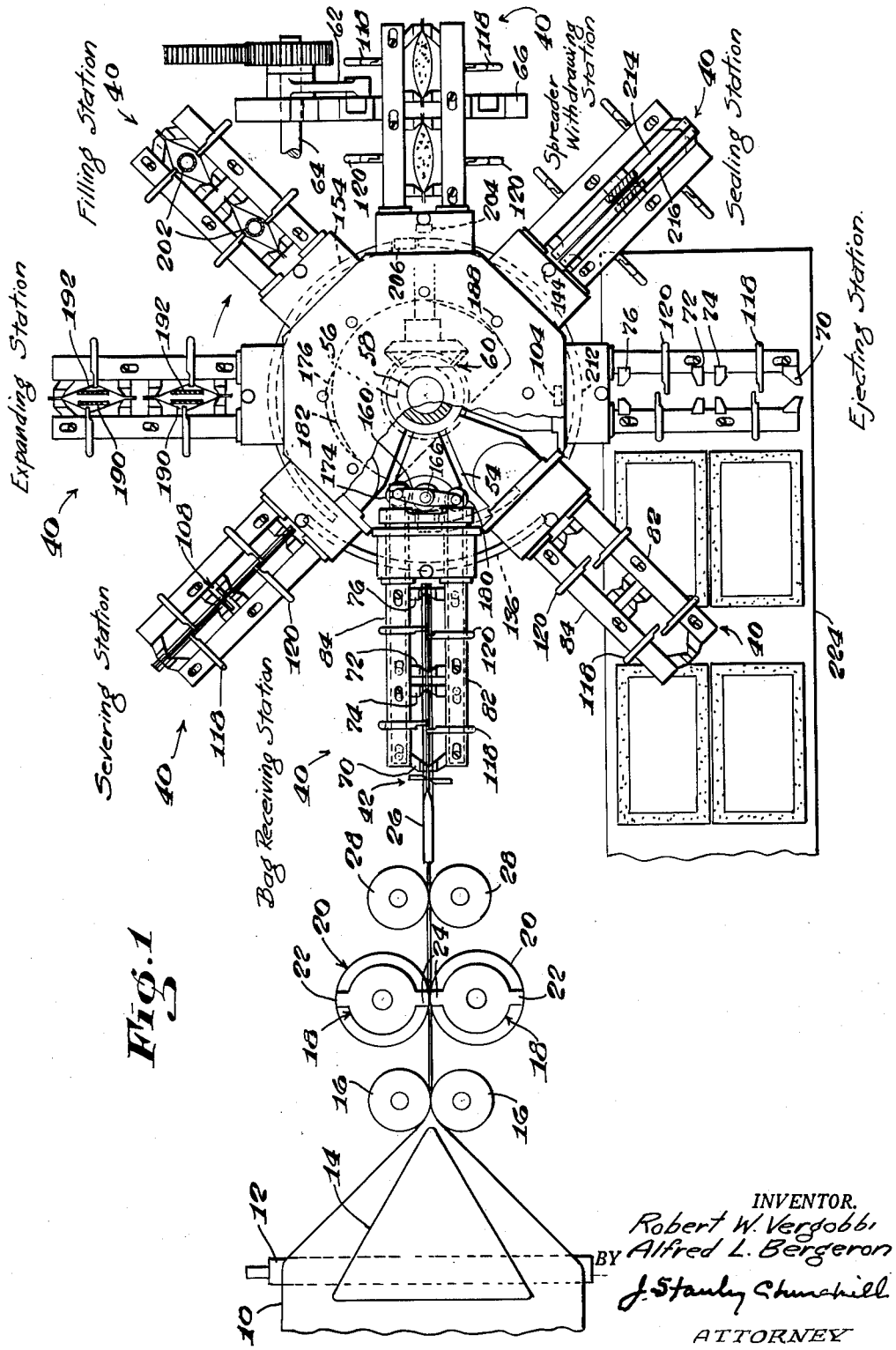
Fig. 1 is a plan view of apparatus for producing filled bags in accordance with the present invention.

Referring now to the drawings, in the apparatus illustrated in Figs. 1 and 2, a web 10 of bag forming material may be withdrawn from a supply roll thereof, not shown, and passed over a roller 12 and under a V-shaped forming member or shoe 14 which in cooperation with idler rolls 16 operates to fold the web longitudinally. The folded bag material then passes between a pair of cooperating heat sealing rollers 18 which are provided with contacting surfaces 20 for forming a continuous longitudinal heat seal along the bottom or folded edge, and with opposed contacting portions 22, 24 arranged to heat seal the strip transversely at spaced intervals to form a series of connected bag sections open at their tops. Provision is also made for spreading the upper edges of the strip during the forming operation in order to facilitate the subsequent insertion of opposed side wall spreading rods to be described. As herein shown, the edge spreading means may comprise a stationary V-shaped member 26 suitably supported above the strip and disposed between the upper edges of the strip, as shown. In practice, sealing of the bag along the bottom or folded edge serves to reinforce the bottom and to form a relatively stronger bag.

The folded and sealed strip of connected bag forming sections is arranged to be periodically advanced a distance of the width of a plurality of bag sections, and as herein shown, of the width of two bag sections each cycle of operation of the machine, by a pair of feed rolls 28 which may be intermittently rotated in timed relation to the subsequent operating mechanisms through any suitable driving mechanism including the bevel and spur gear connections indicated at 30, 32. The heat sealing rollers 18 may be similarly driven through the gearing connections 34, 36.

As herein illustrated, the two endmost bag sections of the strip are advanced into operative relation to one of a plurality of carrier heads, indicated generally at 40, arranged to grip and support the duplex bag section at spaced points adjacent the mouth portion thereof. Provision is made for severing the strip through the second transverse side seam to form the duplex bag section while the strip is thus supported, and for this purpose any suitable cutter may be employed. As herein shown, this operation may be performed by a pair of shears, indicated at 42, mounted to rock on a shaft 44. The shear blades 42 are provided with levers 43 carrying rollers 46 arranged to cooperate with a cam 48 fast on a rocker shaft 50. A spring 52 connected between the levers 43 may be arranged to hold the rollers against the cam 48, and any usual or preferred mechanism may be employed to rock the shaft 50 to effect operation of the shear blades to sever the endmost two bag sections from the strip in timed relation to the strip advancing means.

As illustrated in Figs. 1 and 2, the carriers 40 are radially extended from an intermittently rotated spider 54 secured to and rotatable with an elongated sleeve 56 rotatably supported on a stationary central shaft 58. The sleeve may be intermittently rotated through connections including bevel gears 60 and a Geneva driving mechanism of usual construction comprising a driver 62 secured to a driving shaft 64 and a Geneva spider 66.

Referring now to Fig. 2, each carrier head 40 is arranged to support four pairs of cooperating grippers arranged to grip and support each individual bag section adjacent the ends of the open mouth portion thereof, two pairs of grippers, indicated at 70, 72 being arranged to grip the mouth portions adjacent the left hand ends of the individual bag sections, as viewed in Fig. 2, and the remaining two pairs of grippers 74, 76 being arranged to grip the mouth portions adjacent the right hand ends of the individual bag sections. As herein shown, the grippers are secured to and movable with upper and lower split shaft sections 78, 80 mounted for relative axial movement in longitudinally extended spaced sleeves 82, 84 supported in the carrier head. As illustrated in detail in Fig. 7, the grippers may comprise resilient strips or arms 86 connected to angle pieces 87 and having gripping elements 88 secured to their outer ends, the angle pieces being fitted into slotted portions of and secured to their respective upper and lower split shaft sections 78, 80 by screws 90. The angle pieces 87 extend through slots in the sleeves 82, 84, and the heads of the screws 90 may also extend through slots in the sleeves to permit relative shifting or axial movement of the upper and lower split shaft sections. As illustrated in Fig. 2, showing the grippers supported in the sleeve 82, the grippers 70, 72 are secured to the upper split shaft 78, and the remaining grippers 74, 76 are secured to the lower split shaft 80. The corresponding grippers 70, 72 supported by the sleeve 84 will be secured to the lower split shaft, and grippers 74, 76 will be secured to the upper split shaft supported in the sleeve 84 to permit corresponding movement of the cooperating pairs of grippers, as will be hereinafter described.

Provision is made for rocking the grippers into and out of operative engagement with the bag sections, and as herein shown, each sleeve 82, 84 is mounted to rock in bearings 92 forming a part of the carrier head, the inner end of each sleeve being provided with a gear segment 94 fast thereon arranged to cooperate with a vertically reciprocable gear rack 96 slidably supported in the carrier head. The lower end of the gear rack 96 is provided with a cam roll 98 arranged to cooperate with a stationary cam piece 100 and with vertically slidable cam pieces 102, 104. A spring 106 connects the upper end of the rack 96 with a portion of the carrier head frame and is arranged to urge the rack downwardly to effect rocking of the grippers into gripping engagement with the bag sections. In the operation of the apparatus, the split shaft sections 78, 80 are caused to rock with the sleeves 82, 84 by virtue of the engagement of the grippers in the slotted portions of the sleeves, and in practice, the cam piece 100 is arranged to effect opening of the grippers as the carrier approaches the receiving station. When the carrier comes to rest at the receiving station, the cam roll 98 rests on top of the cam piece 102 in its elevated position, in alignment with the adjacent end of the cam piece 100. Thus, the grippers are held in their open position while the duplex bag section is advanced between the grippers. Thereafter, the cam piece 102 is caused to descend to the position shown in Fig. 4 to effect rocking of the sleeves 82, 84 and gripping of the duplex bag section. The slidable cam section 102 may be reciprocated in timed relation to the strip advancing means through any usual cam operated linkage including the connecting link 107, as shown. In practice, the grippers remain in their closed position during the intermittent movement of the carriers to the various operating stations of the apparatus until the carrier head arrives at the ejecting station, whereupon the slide cam 104, indicated in Fig. 1, is elevated in a similar manner to open the grippers and release the completed bags. As shown in Fig. 2, the upper end of the rack 96 may be provided with a stud 95 extended through an extension from the carrier head, the upper end of the stud having a stop nut 97 attached thereto and arranged to engage the extension for limiting the downward movement of the rack. The cam piece 100 may be supported in a central supporting bracket 109 attached to the machine frame and in which the sleeve 56 is supported.

At the succeeding station of operation, provision is made for severing the duplex bag section through the center seam to form two separate individual bag sections. This may be accomplished by any suitable cutter mechanism, such as a pair of shears, indicated at 108, arranged to be elevated into operative position to sever the bag sections. As illustrated in detail in Fig. 8, the shear blades 108 may be supported by a bracket 110 attached to a rocker arm 112 arranged to rock the shears upwardly into operative position to the bag sections supported by the grippers. One of the shear blades may be fixed relative to the bracket 110, the other blade being pivotally mounted therein and provided with an arm 114 which may be connected by a link 116 to any usual or preferred cam-operated mechanism. In operation, the shear blades are rocked upwardly in their open position, whereupon the movable blade is rocked to sever the bag sections. The arm 112 may also be cam operated in any usual manner to raise and lower the cutter into and out of operative position to the carrier head, as described.

Provision is made for opening the flat bags after the severing operation by separating the side walls thereof, and as illustrated in Figs. 2 and 3, each carrier head 40 is provided with two pairs of bag spreading rods 118, 120 having hooked end portions 122. The spreading rods are adjustably mounted in clamp members 124 fast on spaced rocker shafts 126, 128 extended from the carrier head. In operation, the spreader rods 118, 120 initially assume a vertical position at the receiving station with the hooked end portions 122 disposed immediately above the open mouths of the bags, as indicated in dotted line position #1 in Fig. 3. Thereafter, during the movement of the carrier head from the receiving station to the severing station, the rods 118, 120 are lowered to present the hooked portions 122 between the side walls of the bags, as indicated in full line position #2 in Fig. 3. It will be observed that the tops of the bags have been previously separated slightly by the stationary V-shaped former 26 during the bag forming and advancing operation, thus permitting the spreader rods to enter within their respective bags. Provision is also made for subsequently rocking the spreader rods outwardly to fully open the mouths of the bags, as will be described.

As herein shown, the spaced rocker shafts 126, 128 are journaled in bearings 130 formed in a vertically reciprocable bracket 132 slidingly mounted in the carrier head. The lower end of the slide bracket 132 is provided with a cam roll 134 arranged to cooperate with a stationary cam 136 mounted in the supporting bracket 109 attached to the machine frame. A spring 140 connected between the slide bracket 132 and a portion of the carrier head tends to urge the slide downwardly. A stud 142 connected to the upper end of the slide bracket is arranged to extend through an opening formed in a portion of the carrier head, the stud being provided with a stop nut 144 to limit the downward movement of the slide bracket.

The cam 136 is arranged to raise and lower the slide bracket and the spreader rods as a unit, and after the hooked ends 122 have been lowered between the side walls of the bag, as described, provision is made for rocking the spreader rods 118, 120 outwardly. As illustrated in Figs. 2 and 5, the rocker shafts 126, 128 are provided with cooperating gear segments 148, 150 respectively, one of the segments 150 being provided with a cam roll 152 arranged to engage a stationary cam piece 154 supported in the bracket 109. A spring 156 connected between the segment 148 and the slide bracket 132 is arranged to rock the segments downwardly to effect inward rocking of the spreader rods 118, 120, and a stop stud 158 mounted in the slide bracket 132 is arranged to engage the segment 150 to limit the inward rocking movement of the rods, as shown in Fig. 5.

In operation, during the movement of the carrier head from the severing station to the next succeeding station of operation, herein indicated as the bag expanding station, the cam 154 is designed to rock the spreader rods outwardly from full line position #2 to dotted line position #3, shown in Fig. 3, to spread open the mouth portions of the bags. Simultaneously therewith, the grippers 70, 74 and 72, 76 are caused to move toward each other to contract the mouth portions of their respective bags to permit the side walls of the bags to be spread wide open, as described. As illustrated in Figs. 2 and 4, movement of the grippers connected to their respective split shaft sections 78, 80 is effected by shifting the upper and lower split shaft sections axially relative to each other through cam-operated linkage connected to the ends thereof. As shown in Figs. 1 and 4, the upper half shaft sections are moved in opposite directions by an upper two-armed lever 160 connected thereto by shifting members 162 engaging grooves formed adjacent the inner ends of the shaft sections, and the lower half shaft sections are similarly moved in opposite directions by a lower two-armed lever 164 similarly connected to the ends of the lower half shaft sections. The upper two-armed lever 160 is fast on the upper end of a shaft 166 supported within a sleeve 168 journaled in a bearing 170 formed in the carrier head, and the lower two-armed lever 164 is fast on the upper end of the sleeve 168. The lower end of the shaft 166 is provided with an arm 172 having a cam roll 174 arranged to cooperate with a stationary cam 176 supported in the bracket 109, and the lower end of the sleeve 168 is provided with an arm 178 having a cam roll 180 cooperating with a second stationary cam 182 similarly supported on the bracket 109. Springs 184 connected to the arms 172, 178 are arranged to hold the rolls against their respective cams. The upper end of the shaft 166 extends through a cover plate 186 and is provided with a coller 188 for supporting the upper end of the shaft. Thus, in operation, the cams 176, 182 effect shifting of the upper and lower half shaft sections relative to each other to move the grippers of each set toward one another to contract the mouths of the bags simultaneously with the side wall spreading operation effected by the spreader rods 118, 120 during the movement of the carrier head from the severing station to the bag expanding station.

As illustrated in cross section in Fig. 2 showing the split shaft sections 78, 80 mounted in the sleeve 82, the upper split shaft section 78 carries grippers 70, 72, and the lower split shaft section 80 carries grippers 74, 76. It will be apparent that since the corresponding split shaft sections mounted in the sleeve 84 are moved in reverse directions by virtue of the two-armed lever connections with the upper and lower split shaft sections, the cooperating grippers carried by the sleeve 84 will be reversely mounted with respect to the grippers carried by the sleeve 82. That is, the grippers 70, 72 carried by the upper split shaft 78 mounted in the sleeve 82 will cooperate with the grippers carried by the lower split shaft mounted in the sleeve 84, and the grippers 74, 76 carried by the lower split shaft 80 mounted in the sleeve 82 will cooperate with the gripperes carried by the upper split shaft mounted in the sleeve 84 to effect corresponding movement of the cooperating sets of grippers for movement toward and away from each other.

Figure 13:
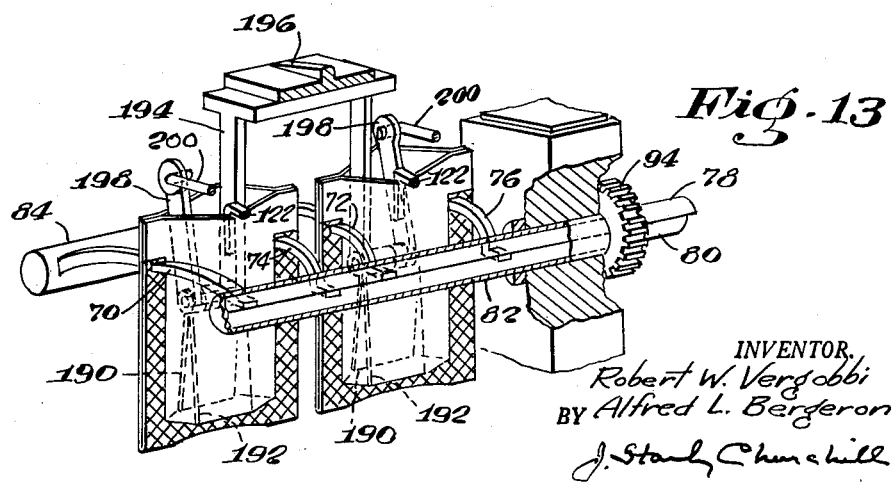

When the carrier head comes to rest at the bag expanding station with the mouth portions of the bags contracted and the side walls of the flat bags spread apart at the upper ends of the bags, provision is made for lowering hinged bag expanding blades into the bags and for spreading the blades in the bags to effect expansion of the side walls adjacent the bottom of the bags an amount substantially equal to the spread of the side walls at the top of the bags preparatory to filling the same. As illustrated in Figs. 9 and 13, the bag expanding mechanism may comprise a pair of tapered blades 190, 192, one of the blades 190 being fixed in a depending bracket 194, the other blade 192 being pivotally mounted therein. The bracket 194 may be carried by a cam-operated lever 196 arranged to rock the spreader blade units into and out of the bags supported in the carrier, and the movable blade 192 is provided with an arm 198 connected by a link 200 which may be cam operated to rock the blade to effect expansion of the lower portion of the bag, whereupon the blades are again closed and the expanding unit withdrawn therefrom. It will be observed that expansion of the lower portion of the bags effects distortion of the bottom, as illustrated in Fig. 13, to afford separation of the side walls of the flat bag, as described.

During the travel of the carrier head from the bag expanding station to the filling station, the bags are maintained in their contracted and spread apart condition, and when the carrier comes to rest, the bags are provided with a charge of the commodity being packaged. This may be accomplished by any usual or preferred form of filling means, indicated generally in Fig. 14, the filling means shown including a pair of filling spouts 202 arranged to be lowered into operative position above the open mouths of the bags and to deposit predetermined charges of the commodity into the bags while the spreader rods 118, 120 hold the mouths of the bags open.

After the filling operation, the filling spouts 202 may be elevated, and when the carrier arrives at the next station of operation, provision is made for withdrawing the spreader rods 118, 120 and for rocking the same outwardly to a position such as to prevent interference with the sealing mechanism at the following station of operation. As herein shown, the spreader rods are withdrawn from the bags by elevating the slide member 132 to move the rods from dotted line position #3 to dotted line position #4 as shown in Fig. 3. This may be accomplished by a vertically reciprocable cam piece 204 engageable with the cam roll 134 carried by the slide member. Substantially simultaneously therewith, a second vertically reciprocable cam piece 206 cooperating with the cam roll 152 carried by the rocker arm 150 is also elevated to maintain the rods in the intermediate spread position during their elevation from position #3 to position #4. Thereafter, the cam piece 204 is caused to descend to lower the slide unit 132 and the spreader rods 118, 120 while cam piece 206 remains in its elevated position, thus causing the rods to spread apart to their maximum outwardly spread position, as indicated by dotted line position #5 in Fig. 3. The cam pieces 204, 206 may be connected by links 208, 210 respectively to any usual or preferred cam-operated mechanism arranged to operate the cams in the manner described in timed relation to the movement of the carrier heads.

As illustrated in Fig. 6, the top of the cam piece 206 in its elevated position is disposed in alignment with a stationary cam piece 212, and during the movement of the carrier from the rod withdrawing station to the top sealing station, the cam roll 152 rides on the cam piece 212 to maintain the rods 118, 120 in their maximum outwardly rocked position. Provision is also made during the movement of the carrier to the sealing station for again moving the grippers apart to their initially spaced position to extend the mouth portions of the bag, thus bringing the sides of the mouth portions together preparatory to the sealing operation. Such movement of the grippers is effected by the stationary cams 176, 182 arranged to shift the upper and lower split shaft sections 78, 80 relative to each other in the manner previously described to cause the grippers to move away from each other.

Any usual or preferred form of sealing mechanism may be employed for heat sealing the mouth portions of the bag, herein shown as comprising a pair of heated sealing blocks 214, 216 arranged to be closed and pressed over the mouth portions of the bags to effect the sealing operation. One of the sealing blocks 214 may be fixed to a cam-operated lever 218 arranged to be rocked to present the sealing blocks into and out of sealing position, the other block 216 being pivotally mounted on the lever 218 and provided with an arm 220 connected by a rod 222 to any usual cam-operated linkage.

After the sealing operation, the carrier is moved to the ejecting station, and during the movement of the carrier from the sealing station to the ejecting station, the cam 212 is designed to permit the spreader rods 118, 120 to return to their vertical position. At the ejecting station, the vertically reciprocable cam piece 104, see Fig. 1, cooperating with the cam roll 98 carried by the rack gear 96 is arranged to be elevated to cause the grippers to be rocked outwardly and thus release the bags, whereupon the cam piece 104 is again lowered. The released bags may fall by gravity onto a discharge belt 224 to convey the bags away from the machine. Upon lowering of the cam piece 104, the grippers are returned to their closed positions by the spring 106. Thereafter, during the approach of the carrier to the receiving station, the grippers are again opened by the stationary cam piece 100 preparatory to receiving newly presented bags advanced therebetween, and the spreader rods 118, 120 are elevated by the stationary cam 136 to assume position #1 in Fig. 3 above the mouths of the newly presented bags.

Figure 11:
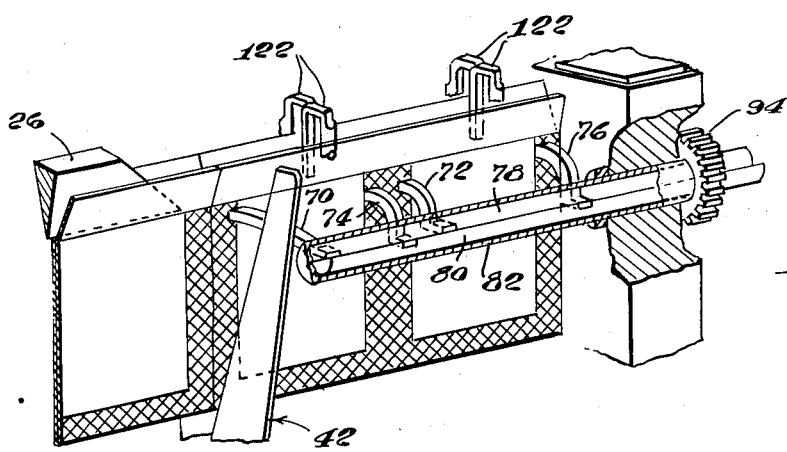
Figure 12:
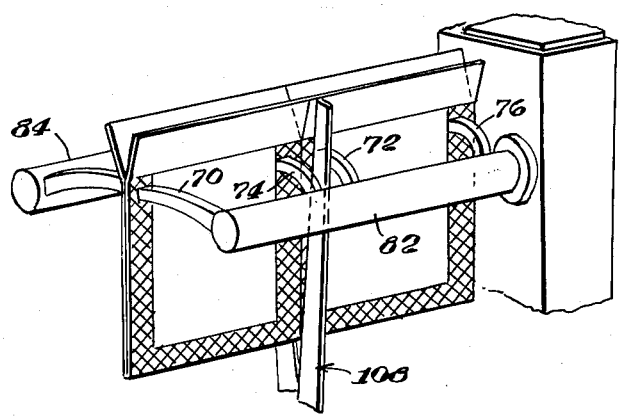

From the above description, it will be observed that in accordance with the preferred method of producing filled bags, an individual flat bag sealed on the bottom and the two sides and open at the top is supported by grippers disposed adjacent the ends of and slightly below the mouth portions thereof. It will be observed that the transverse sealed portions forming the side seams do not extend to the top of the bag, the seal terminating a short distance below the top, and the grippers preferably engage the ends of the bag near or slightly below the upper edge of the side seams, as shown in Fig. 11. In the preferred embodiment of the invention, a strip of connected bag sections is severed to form a duplex section, as indicated in Fig. 11, and the duplex section is subsequently severed to form two individual bags, as shown in Fig. 12. Thereafter, the grippers for each individual bag are caused to move toward each other to contract the mouth of the bag, and simultaneously therewith, the flat side walls of the bag are spread outwardly to open the mouth of the bag, and in order to provide space at the bottom of the flat bag, the side walls are expanded adjacent the bottom thereof, as shown in Fig. 13. A charge of the commodity is then deposited into the open bag, as indicated in Fig. 14, whereupon the grippers are again moved away from each other to extend the mouth portion of the filled bag and to bring the sides of the mouth together. While thus extended, the mouth portion is sealed by the application of heat and pressure, as indicated in Fig. 15, to complete the production of a filled and sealed bag. The bag may then be released by rocking the grippers outwardly, as shown in Fig. 16, to discharge the bag.

It will be observed that the present apparatus is capable of operation upon two bags simultaneously in each carrier head, thus increasing the capacity of the apparatus to produce filled and sealed bags in a rapid, economical and efficient manner.

While the preferred apparatus embodying the invention and for practicing the present method have been herein illustrated and described, it will be understood that the invention may be embodied in other forms within the scope of the following claims.

Having thus described the invention, what is claimed is:

1. In a method of making individual filled and closed bags, the steps comprising folding and sealing a web of bag making material to form a strip of connected flat bag sections open at the top, gripping and supporting successive two bag sections comprising the two endmost bags of the strip at points adjacent the ends of the open top portions of each bag and severing the two bag section from the strip while thus supported, then severing the two bag section to form two individual bags, spreading the flat side walls of each bag apart while simultaneously moving the gripped ends of each bag toward each other to open the mouths of the bags, then expanding the side walls adjacent the bottom of the bags, depositing a charge of the commodity into each bag, then moving the gripped ends of each bag away from each other to close the mouth of each bag, and thereafter sealing the mouths to complete the production of two bags simultaneously.

2. In apparatus of the character described, in combination, means for supporting a flat bag open at the top including spaced grippers engageable with the ends of the open top of the bag, means for moving the grippers at each end toward each other to contract the mouth of the bag, and means operating simultaneously with the contracting operation for spreading apart the flat side walls of the bag to open the mouth of the bag preparatory to filling the same, said bag mouth spreading means including a pair of hooked rods mounted to be moved vertically to present the hooked ends into the mouth of the bag and also arranged to be rocked outwardly to effect spreading of the side walls adjacent the mouth of the bag.

3. In apparatus of the character described, in combination, means for supporting a flat bag open at the top including spaced grippers engageable with the ends of the open top of the bag, means for moving the grippers at each end toward each other to contact the mouth of the bag, and means operating simultaneously with the contracting operation for spreading apart the flat side walls of the bag to open the mouth of the bag, and expansible means insertable into the bag for expanding the lower end of the bag preparatory to filling the same, said bag mouth spreading means including a pair of hooked rods mounted to be moved vertically to present the hooked ends into the mouth of the bag and also arranged to be rocked outwardly to effect spreading of the side walls adjacent the mouth of the bag.

4. In apparatus of the character described, in combination, means for supporting a flat bag open at the top including spaced grippers engageable with the ends of the open top of the bag, means for moving the grippers at each end toward each other to contract the mouth of the bag, means operating simultaneously with the contracting operation for spreading apart the flat side walls of the bag to open the mouth of the bag preparatory to filling the same, means for filling the bag, means for then moving the grippers at each end away from each other to extend and close the bag mouth, and means for thereafter sealing the mouth to complete the production of the bag, said bag mouth spreading means including a pair of hooked rods mounted to be moved vertically to present the hooked ends into the mouth of the bag and also arranged to be rocked outwardly to effect spreading of the side walls adjacent the mouth of the bag.

5. In apparatus of the character described in combination, means for operatively supporting and advancing a strip of connected flat bag sections open at the top, means for gripping successive endmost bag sections of the strip including spaced grippers engageable with the ends of the open top of the bag, means for severing the endmost bag section from the strip while thus gripped, said grippers being mounted for movement toward and away from each other to contract and extend respectively the mouth portion of the bag, means operating simultaneously with a contracting operation for spreading apart the flat side walls of the bag to open the mouth, and expansible means insertable into the bag for expanding the lower end of the bag preparatory to filling the same.

6. In apparatus of the character described, in combination, means for operatively supporting and advancing a strip of connected flat bag sections open at the top, means for gripping successive endmost bag sections of the strip including spaced grippers engageable with the ends of the open top of the bag, means for severing the endmost bag section grom the strip while thus gripped, said grippers being mounted for movement toward and away from each other to contract and extend respectively the mouth portion of the bag, means operating simultaneously with a contracting operation for spreading apart the flat side walls of the bag to open the mouth, expansible means insertable into the bag for expanding the lower end of the bag preparatory to filling the same, bag filling means for then moving the grippers at each end away from each other to extend and close the bag mouth, and means for thereafter sealing the mouth to complete the production of the bag.

7. In apparatus of the character described, in combination, means for operatively supporting and intermittently advancing a strip of connected bag sections open at the top, means for gripping successive two bag sections comprising the two endmost bags of the strip at points adjacent the ends of the open top portions of each bag, means for severing the two bag section from the strip while thus supported, means for thereafter severing the two bag section to form two individual bags, the grippers for each bag being mounted for movement toward and away from each other to contract and extend respectively the mouth portion of each bag, means operating simultaneously with the contracting operation for spreading apart the flat side walls of each bag to open the mouths of the bags, expansible means insertable into each bag for expanding the lower ends of the bags, bag filling means, means for then moving the grippers to extend and close the bag mouths, and means for thereafter sealing the mouths to complete the production of the bags.

8. In apparatus of the character described, in combination, an intermittently rotated spider having a plurality of radially extended carrier heads, each head having at least two pairs of spaced grippers mounted for gripping engagement and for movement laterally toward and away from each other, means for intermittently advancing a strip of connected flat bag sections open at the top to present successive endmost bag sections into operative position to be engaged by said grippers at points adjacent the ends of the open top of the bag section, means for severing the endmost bag section from the strip while thus supported, means for moving the grippers toward each other to contract the mouth of the bag, and means mounted in said carrier head and operating simultaneously with the contracting operation for spreading apart the flat side walls of the bag to open the mouth thereof preparatory to filling the same.

9. In apparatus of the character described, in combination, an intermittently rotated spider having a plurality of radially extended carrier heads, each head having at least two pairs of spaced grippers mounted for gripping engagement and for movement laterally toward and away from each other, means for intermittently advancing a strip of connected flat bag sections open at the top to present successive endmost bag sections into operative position to be engaged by said grippers at points adjacent the ends of the open top of the bag section, means for severing the endmost bag section from the strip while thus supported, means for moving the grippers toward each other to contract the mouth of the bag, means mounted in said carrier head and operating simultaneously with the contracting operation for spreading apart the flat side walls of the bag to open the mouth thereof preparatory to filling the same, and expansible means insertable into the bag for expanding the flat side walls adjacent the bottom of the bag preparatory to filling the same.

10. In apparatus of the character described, in combination, an intermittently rotated spider having a plurality of radially extended carrier heads, each head having at least two pairs of spaced grippers mounted for gripping engagement and for movement laterally toward and away from each other, means for intermittently advancing a strip of connected flat bag sections open at the top to present successive endmost bag sections into operative position to be engaged by said grippers at points adjacent the ends of the open top of the bag section, means for severing the endmost bag section from the strip while thus supported, means for moving the grippers toward each other to contract the mouth of the bag, means mounted in said carrier head and operating simultaneously with the contracting operation for spreading apart the flat side walls of the bag to open the mouth thereof preparatory to filling the same, and means for mounting said grippers including a pair of spaced tubes mounted in said carrier head, each tube having a pair of longitudinally split half shafts supported therein for axial movement relative to each other in opposite directions, one gripper of each pair being secured to opposing half shafts for movement therewith toward and away from each other, said grippers being mounted to rock with said tubes to effect rocking of the grippers into and out of gripping engagement.

11. In apparatus of the character described, in combination, an intermittently rotated spider having a plurality of radially extended carrier heads, each head having at least two pairs of spaced grippers mounted for gripping engagement and for movement laterally toward and away from each other, means for intermittently advancing a strip of connected flat bag sections open at the top to present successive endmost bag sections into operative position to be engaged by said grippers at points adjacent the ends of the open top of the bag section, means for severing the endmost bag section from the strip while thus supported, means for moving the grippers toward each other to contract the mouth of the bag, and means mounted in said carrier head and operating simultaneously with the contracting operation for spreading apart the flat side walls of the bag to open the mouth thereof preparatory to filling the same, said spreading means comprising hooked rods secured to and movable with said carrier head and mounted for vertical movement to present the hooked ends into the mouth of the bag, said rods being arranged to be rocked outwardly to effect spreading of the side walls adjacent the mouth of the bag.

12. In apparatus of the character described, in combination, an intermittently rotated spider having a plurality of radially extended carrier heads, each head having at least two pairs of spaced grippers mounted for gripping engagement and for movement laterally toward and away from each other, means for intermittently advancing a strip of connected flat bag sections open at the top to present successive endmost bag sections into operative position to be engaged by said grippers at points adjacent the ends of the open top of the bag section, means for severing the endmost bag section from the strip while thus supported, means for moving the grippers toward each other to contact the mouth of the bag, means mounted in said carrier head and operating simultaneously with the contracting operation for spreading apart the flat side walls of the bag to open the mouth thereof preparatory to filling the same, bag filling means, said gripper moving means then moving the grippers at each end away from each other to extend and close the bag mouth, and means for thereafter sealing the mouth to complete the production of the bag.

13. The combination as defined in claim 12 wherein each carrier head is arranged to support a two bag section and which includes a cutter for severing the two bag section while supported in said carrier to form two individual bags.

14. The combination as defined in claim 8 having provision for folding an elongated web of bag forming material, sealing the web longitudinally along the folded edge and at spaced intervals to form the strip of connected bag sections open at the top, and a stationary V-shaped spreading member supported adjacent the upper edge of the strip to separate the upper edges to facilitate insertion of the spreading means.

References Cited in the file of this patent

UNITED STATES PATENTS

| | | |
|---|---|---|
| 574,137 | Cummings | Dec. 29, 1896 |
| 1,909,319 | Taylor | May 16, 1933 |
| 2,213,729 | Anderson | Sept. 3, 1940 |
| 2,269,532 | Howard | Jan. 13, 1942 |